(12) United States Patent
Zimmermann

(10) Patent No.: US 12,260,603 B2
(45) Date of Patent: Mar. 25, 2025

(54) SYSTEM AND METHOD FOR OPTICAL DETECTION AND IDENTIFICATION OF PATHOGENS IN A THIN LAYER OF FLUID

(71) Applicant: Micha Zimmermann, Haifa (IL)

(72) Inventor: Micha Zimmermann, Haifa (IL)

( * ) Notice: Subject to any disclaimer, the term of this patent is extended or adjusted under 35 U.S.C. 154(b) by 0 days.

(21) Appl. No.: 18/645,744

(22) Filed: Apr. 25, 2024

(65) Prior Publication Data

US 2024/0273850 A1     Aug. 15, 2024

Related U.S. Application Data

(63) Continuation of application No. PCT/IL2022/051130, filed on Oct. 26, 2022.

(60) Provisional application No. 63/272,015, filed on Oct. 26, 2021.

(51) Int. Cl.
| | |
|---|---|
| *G06V 10/145* | (2022.01) |
| *G06T 7/00* | (2017.01) |
| *G06V 10/10* | (2022.01) |
| *G06V 10/764* | (2022.01) |

(52) U.S. Cl.
CPC .......... *G06V 10/145* (2022.01); *G06T 7/0012* (2013.01); *G06V 10/17* (2022.01); *G06V 10/764* (2022.01); *G06T 2207/20081* (2013.01); *G06T 2207/30004* (2013.01); *G06V 2201/03* (2022.01)

(58) Field of Classification Search
None
See application file for complete search history.

(56) References Cited

U.S. PATENT DOCUMENTS

| | | | |
|---|---|---|---|
| 2007/0178607 A1* | 8/2007 | Prober | G01N 33/54346 436/524 |
| 2011/0189721 A1* | 8/2011 | Deutsch | G01N 33/5005 435/173.9 |

(Continued)

FOREIGN PATENT DOCUMENTS

| | | | |
|---|---|---|---|
| WO | WO 2007/077218 | | 7/2007 |
| WO | WO2021158700 | * | 8/2021 |

OTHER PUBLICATIONS

Blickenstorfer Yves et al: "Total internal reflection focal molography (TIR-M)", Sensors and Actuators B: Chemical, Elsevier Bv, Nl, vol. 349, Sep. 20, 2021 (Sep. 20, 2021).

*Primary Examiner* — Christopher Braniff
(74) *Attorney, Agent, or Firm* — PEARL COHEN ZEDEK LATZER BARATZ LLP

(57) ABSTRACT

A method and system for optical detection and identification of pathogens in a thin layer of fluid, are provided herein. The system may include: a consumable part comprising: a fluid reservoir; a pathogen trap in fluid communication with the fluid reservoir; and a base attached to the fluid reservoir; and an electro-optical part comprising: a generally coherent light source for directing a generally a coherent light beam at the flat surface at an angle selected to cause total internal reflection of the generally coherent light beam at the surface and an evanescent wave penetrating the fluid; a camera facing the surface for capturing light scattering being scattered off the pathogens on the pathogen trap due to an interaction with the evanescent wave, forming a speckle image; and a computer processor configured to analyze the speckle image, to detect and identify pathogens in a fluid inserted into the fluid reservoir.

18 Claims, 11 Drawing Sheets

(56) References Cited

U.S. PATENT DOCUMENTS

2017/0328894 A1 11/2017 Zijlstra et al.
2020/0064354 A1 2/2020 Salafsky et al.

\* cited by examiner

SYSTEM AND METHOD FOR OPTICAL DETECTION AND IDENTIFICATION OF PATHOGENS IN A THIN LAYER OF FLUID

CROSS REFERENCE TO RELATED APPLICATION

This application is a Continuation Application of PCT Application No. PCT/IL2022/051130 filed Oct. 26, 2022, claiming priority from U.S. Provisional Patent Application No. 63/272,015 filed Oct. 26, 2021, both are incorporated herein by reference in their entirety.

FIELD OF THE INVENTION

The present invention relates generally to the field of detecting and identifying pathogens in a fluid carrier, and more particularly to an electro-optical set up for accurate detection and identification of same.

BACKGROUND OF THE INVENTION

Prior to the background of the invention being set forth, it may be helpful to provide definitions of certain terms that will be used hereinafter.

The term "pathogen" as used herein is defined as an organism causing disease to its host, with the severity of the disease symptoms referred to as virulence. Pathogens are taxonomically widely diverse and comprise viruses and bacteria as well as unicellular and multicellular eukaryotes. Hereinafter, reference to virus may include any kind of pathogen, as suitable by the context.

The term "laser" as used herein is light emitted through a process of optical amplification based on the stimulated emission electromagnetic radiation. A laser differs from other sources of light in that it emits light which is coherent. Hereinafter, reference to laser may include any kind of generally coherent light, as suitable by the context.

Health disasters such as the increase in the emergence of drug-resistant pathogens have accelerated investment in global health. As the public health community works to strengthen national health systems to prevent the international spread of disease, government bodies are increasingly recognizing that biological threats have not only global health effects but also far-reaching socio-economic impacts. More comprehensive economic assessments can provide a multi-system understanding of disease costs beyond traditional approaches focused on human health, which only consider a number of patients, direct medical expenses and governmental action to reduce the impact of the disease on public health.

Health is at the heart of a thriving society, while fear and disease can stifle production, consumption, recreation, travel, and general well-being. While out-of-health sectors are often perceived in the context of disease-causing accelerators, the potential impacts on them from disease events justify involvement in finding multi-system solutions for reducing and managing health risks as well as socioeconomic risks. Epidemics have far-reaching effects similar to those of other disasters, local like war and earthquake and global like economic recession.

Although the new global arena has created economic opportunities and growth, the benefits have not been equally distributed, and the risks-especially the health risks—of this increasingly interconnected and fast-paced world continue to grow. As people, products, food, and capital travel the world in unprecedented numbers and at historic speeds, so, too, do the myriad of disease-causing microorganisms.

The potential for the spread of disease is exemplified by an exponential increase, which began in the 1950s of people traveling the world, reaching the volume of traffic today of over 1.4 billion passengers a year. A small number of patients among those passengers may produce an exponential response to infection.

Traditionally, epidemiological control of most infections is based on isolation of cases. When produce, animals or a commercial product turns out to be the culprit, public announcements and recalling the perpetrator may prevent many additional cases. The avenues of approach in the case of humans could be closure of those who come in contact, personal protection by means of infection prevention and mass vaccination because there is usually no specific anti-pathogen treatment for most infections.

As part of the strategy to emerge from a global epidemiological crisis, in the health, social as well as economic context, there is a need for early and reliable identification of carriers through rapid, inexpensive and extensive screening tests. Early and effective detection of pathogens makes it possible to anticipate the development of the threat and to implement appropriate means of prevention, treatment, disease management and control. Identifying patients or carriers allows for the amputation of infection chains quickly and effectively to prevent an outbreak in the general population.

SUMMARY OF THE INVENTION

Some embodiments of the present invention provide a method and system for optical detection and identification of pathogens in a thin layer of fluid. The system may include: a consumable part comprising: a fluid reservoir having at least one surface; a pathogen trap on at least one surface in fluid communication with the fluid reservoir; and a transparent base attached to the fluid reservoir with the flow channel overlapping the surface; and an electro-optical part comprising: a generally coherent light source for directing a generally a coherent light beam at the surface at an angle selected to cause total internal reflection of the generally coherent light beam at the surface and an evanescent wave penetrating the fluid; a camera facing the surface for capturing light scattering being scattered off the pathogens on the pathogen trap due to an interaction with the evanescent wave, forming a speckle image; and a computer processor configured to analyze the speckle image, to detect and identify pathogens in a fluid in the fluid reservoir.

Embodiments of the invention provide a multidisciplinary method and device, combining electro-optics, surface chemistry, pathogen and virus traps, pathogens, machine learning-based algorithms, diffusion in liquids, liquid flow, software and other fields of endeavor aimed at analyzing optical scattering signatures for pathogen detection and identification.

In some embodiments, the system of the present invention may detect and identify a virus from biological fluid samples like saliva, nose mucus, nasal swab and others. It is understood that the word saliva is used herein as an example for a virus carrying platform by, embodiments of the present invention are not limited to identifying viruses in saliva only and can be used as explained hereinafter, for identifying pathogens in general in any fluid.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 8A and 8B are diagrams illustrating an example of the structure of the system for Optics Based Pathogen Diagnostic with the Consumable part inserted into the Opto-Mechanical Module and the light source turned on.

Figure 1:
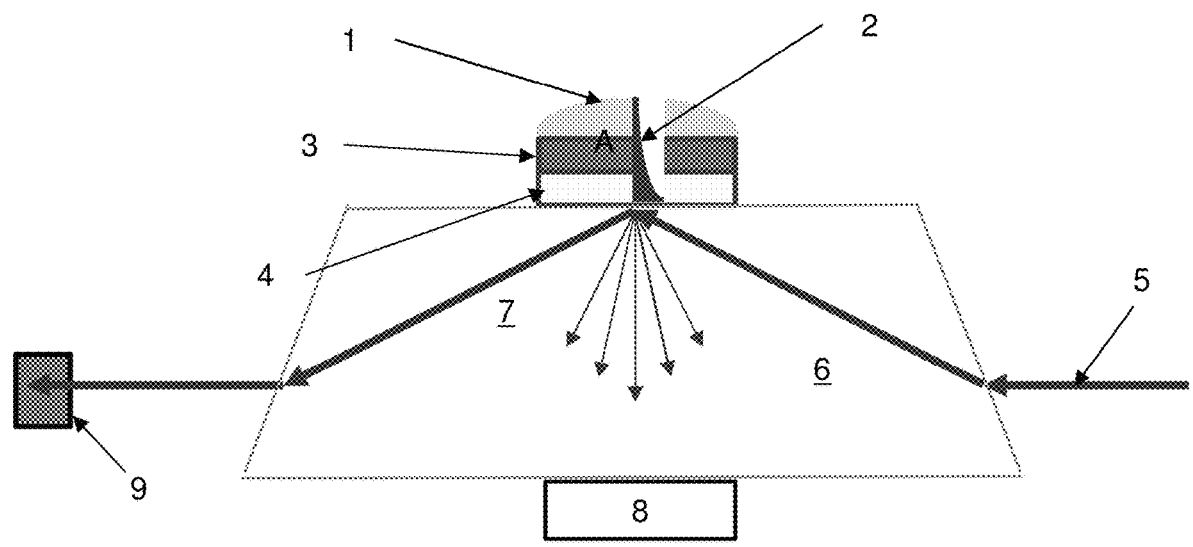
FIG. 1 is schematic diagram of the viral trap, optical subsystem laser and camera. The layers relative dimensions and thicknesses are emphasized for clarification purposes of the system in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

It is further understood that some embodiments of the present invention may be embodied in the form of a system, a method, or a computer program product. Similarly, some embodiments may be embodied as hardware, software, or a combination of both. Some embodiments may be embodied as a computer program product saved on one or more non-transitory computer-readable medium (or mediums) in the form of computer-readable program code embodied thereon. Such non-transitory computer-readable medium may include instructions that when executed cause a processor to execute method steps in accordance with embodiments. In some embodiments, the instructions stored on the computer-readable medium may be in the form of an installed application and in the form of an installation package.

Such instructions may be, for example, loaded by one or more processors and get executed. For example, the computer-readable medium may be a non-transitory computer-readable storage medium. A non-transitory computer-readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units, and/or circuits have not been described in detail so as not to obscure the invention. Some features or elements described with respect to one embodiment can be combined with features or elements described with respect to other embodiments.

FIG. 1 is schematic diagram of depicting the general set-up in accordance with embodiments of the present invention showing the optical subsystem which includes laser beam 5 and camera 8. The layers relative dimensions and thicknesses are emphasized for clarification purposes of the system in accordance with embodiments of the present invention and include: the fluid e.g., saliva 1, the viral trap 4, the adsorbed viral layer 3. The laser beam may be directed by transparent block 6 towards the adsorbed viral layer 3 accumulated due to viral trap 4 where the laser beam undergoes a total internal reflection resulting in a decaying evanescent wave 2 penetrating into adsorbed viral layer 3. Light scattering 7 coming from adsorbed viral layer 3 is captured by camera 8 and the image can be then analyzed. For safety, the laser beam may be absorbed by an optical trap 9.

In some embodiments, a viral trap can be used to attract the viruses into a consumable part device. One method of achieving a viral trap is by attaching antibodies to a surface but there are others as is known in the art. Viruses within the saliva, in a close enough vicinity or coming into contact with the surface will be adsorbed to it. The principle of operation is based on a generally coherent light beam such as laser that impinges on the surface on which the virus is trapped and the analysis of the light scattering pattern. Speckle scattering produced by a generally coherent beam will be used in the following to describe the methodology by way of example. The virus has a different coefficient of refraction than that of the environment that carries the virus, which results in the scattering phenomenon. Due to the fact that saliva contains additional components on top of the virus, Total Internal Reflection (TIR) is used to sample only a thin layer of saliva, with a thickness on the order of a wavelength, adjacent to the layer on which the virus is attached.

The laser light strikes the surface to which the virus is bound from within the transparent block and does not pass through the saliva bulk. The top surface of the Transparent Block could be coated with appropriate surface chemistry using an antibody, by way of example, that identifies a protein component on the virus as is known in the art. This will result in an Adsorbed Viral Layer (. The laser light impinges, below the surface on which the viral layer accumulates, at an angle corresponding to Total Internal Reflection (TIR) so that the laser beam does not cross the surface with the virus trap into the saliva bulk. In the area of impact of the beam (A), from the other side of the surface, a field known as an Evanescent Wave is formed at the interface with the saliva. The penetration depth of the Evanescent Wave into the saliva is on the order of magnitude of a wavelength, decaying exponentially, where the penetration thickness depends mainly on the angle of incidence and the differences in the refractive index at the interface between the material on which the trap resides and the saliva. The layer's relative dimensions and thicknesses are emphasized for clarification purposes The thickness of the virus trap is determined by the virus or pathogens that needs to be identify. The effective depth of the evanescent wave is in fact of the order of magnitude of wavelength and can be controlled to some extent by varying the angle of incidence and the refractive index differences.

A single trap can off course be designed to adsorb and/or trap more than a single virus. An additional possibility would be to implement more than one trap in the field of view of the impinging light source and camera, each designed to trap a single or more viruses. This will allow the detection and identification of more than one virus in a single testing procedure.

Figure 2A:
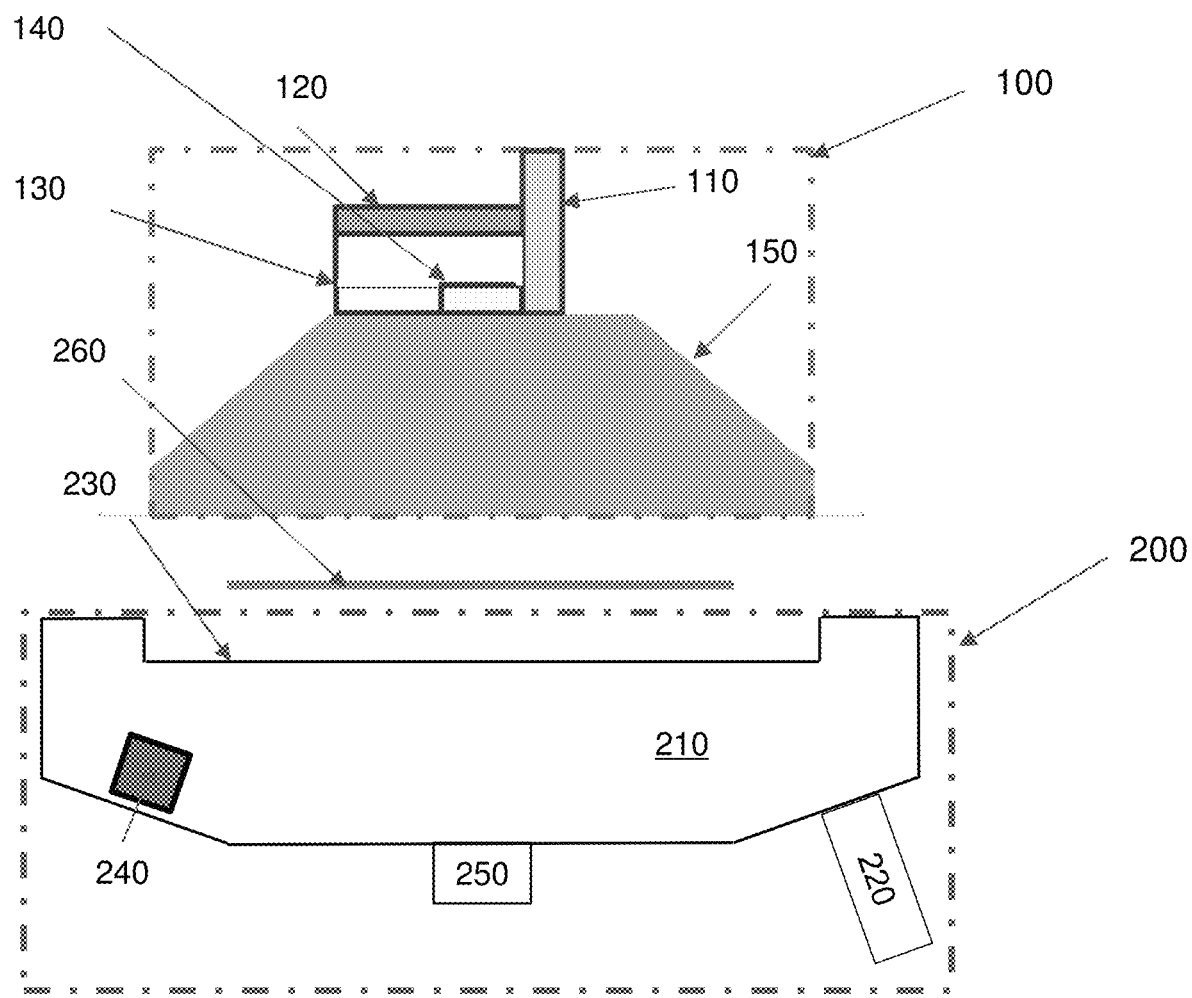
FIG. 2A is a diagram depicting he consumable on the top, disconnected from the opto-mechanical module on the bottom. The consumable includes amongst others the base, the viral trap, the saliva reservoir and the flow channel. The opto-mechanical module includes amongst others the transparent block, the laser the Light Trap and the Camera. The precise positioning of the consumable part within the opto-mechanical module is provided by an indentation in the opto-mechanical module by way of example.
Figure 2B:
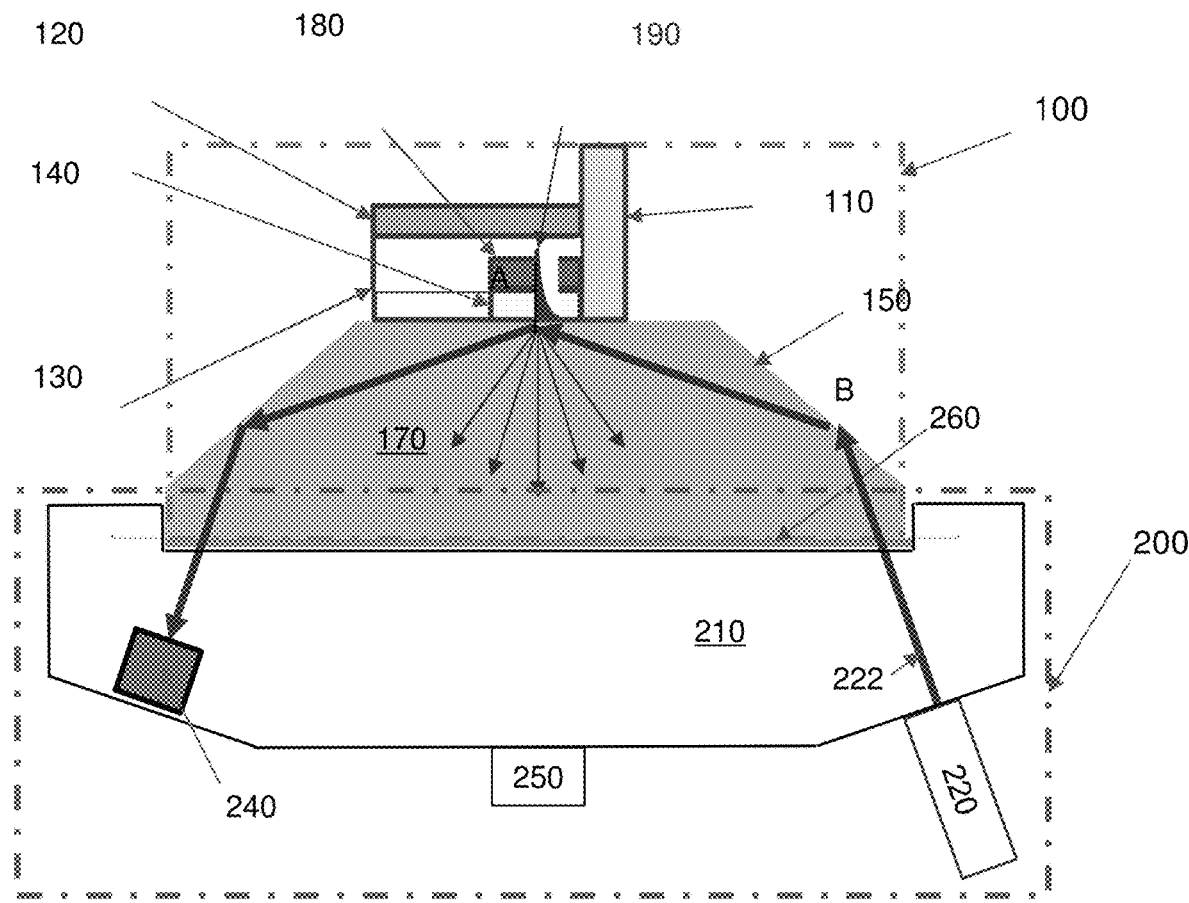
FIG. 2B is a diagram illustrating a consumable part is inserted into the optical subsystem after applying an index-matching layer to reduce unwanted reflections if desired. When the saliva will be made to flow, the viral load will accumulate over the trap and produce a viral layer. The general point of incidence, A, of the generally coherent light beam on the viral trap is close to the saliva reservoir. This allows a longer flow time over the trap to increase the viral density on the trap. The layers' relative dimensions like length, width and thickness are emphasized for clarification purposes only.

FIGS. 2A and 2B show a system which may include: a consumable part 100 comprising: a fluid reservoir 110 having at least one surface; a pathogen trap 140 on at least one surface in fluid communication with the fluid reservoir 110; and a base 150 attached to the fluid reservoir 110 with the flow channel overlapping the surface; and an electro-optical part 200 comprising: a generally coherent light source 220) for directing a generally a coherent light beam at the surface at an angle selected to cause total internal reflection of the generally coherent light beam at the surface and an evanescent wave penetrating the fluid; a camera 250 facing the surface for capturing light scattering 170 being scattered off the pathogens accumulated in the pathogen layer 180 on the pathogen trap 140 due to an interaction with the evanescent wave 190, forming a speckle image; and a computer processor (not shown) configured to analyze the speckle image, to detect and identify pathogens in a fluid inserted into the fluid reservoir 110.

The consumable part 100 may be used for one to a few tests until its effectiveness expires after which it will be disposed of. A viral trap 140 could be implemented by utilizing an appropriate surface chemistry, based on the detection of a virus induced immune complex, of a specific and high affinity binding between Antibodies and the membrane viral antigen, by way of example or any other method known in the art. The Consumable/System will take advantage of TIR to minimize the effect on the measured signal of interest by the non-viral components in the saliva sample.

According to some embodiments of the present invention, consumable part 100 may be constructed from a base 150 which is transparent in the physical space in which the optical interaction takes place. This base 150 can be similar to a modified microscope slide by way of example. The viral trap 140 is located in that optically active space. A flow channel 130 above the viral trap 140 is used to sweep the saliva sample across the trap. The flow channel is fed by a reservoir 110 into which the saliva is introduced. The saliva can be made to flow spontaneously due to a channel with a capillary structure or partly capillary structure. The saliva can also be made to flow under an external driving force like a syringe, a vacuum vessel that is punctured by the user or a pressure vessel that is punctured by the user, all these by way of example.

The base in FIG. 2A on which the trap resides is constructed from a material with an index of refraction which will provide the appropriate evanescent wave penetration depth. The saliva moves through the flow channel during the speckle signal acquisition process. The flow over the trap causes the viral load to accumulate, dynamically varying the strength as well as modifying the shape of the speckle signal while simultaneously sweeping other saliva components away.

The consumable part 100 is inserted into the electro-optic part 200. The precise positioning of the consumable part 100 within electro-optic part 200 is provided by an indentation of the electro-optic part 200 by way of example. The laser beam 222 is designed to interrogate the adsorbed viral load on the viral trap 140 on the base 150 at TIR. The laser beam is introduced into the transparent block 210 in the electro-optic part 200 and enters the consumable part 100 through an index matching layer 260, which could be a fluid by way of example, to minimize reflection and scattering if desired. The light beam is manipulated by optical means to provide the required TIR angle of incidence on the bottom of the surface on which the trap resides. This is demonstrated by point B in FIG. 2B which designated the incidence point of the light beam on a turning mirror. The evanescent wave 190 interacts only with a thin layer of the saliva sample. The interaction layer is the penetration depth of the evanescent wave which is of the order of a wavelength. The laser beam therefore does not interact with the bulk of the saliva sample which contains other components that could mask the required signal.

The system parameters, like index of refraction and angle of incidence, can be engineered to control the penetration depth of the evanescent wave. The depth extent of the evanescent wave, using these parameters, will optimally sample the viral load adsorbed on the trap so that the scattering from other non-viral components, in the saliva bulk, will have a minimal effect on the speckle signal of interest. In addition, other non-viral components in the saliva are moving under the flow forces and will therefore not provide a stationary speckle pattern but rather a weak homogeneous background depending on the flow rate, exposure time and other parameters as is known in the art.

The consumable part in FIG. 2A is inserted into an indentation in the electro-optic part 200 as shown in FIG. 2B. An index matching layer 260 can be used to minimize unwanted parasitic reflections and scattering from the interface by way of example. The laser beam, designed to interrogate the interface between the optical base and the adsorbed viral layer at TIR, is turned on as shown schematically in FIG. 2B. A saliva sample is inserted into the saliva reservoir once the laser has stabilized. The camera triggers once it detects saliva flow in the channel. The required signal is the continuous change in the speckle pattern shape and strength resulting from the variation caused by the changing viral load trapped by the adsorption layer.

The speckle contrast is affected by the spectral purity as well as the spatial coherence of the light source. The best contrast when using a laser will be obtained by a high purity source like a single longitudinal and spatial mode narrow spectral width laser by way of example.

Figure 3:
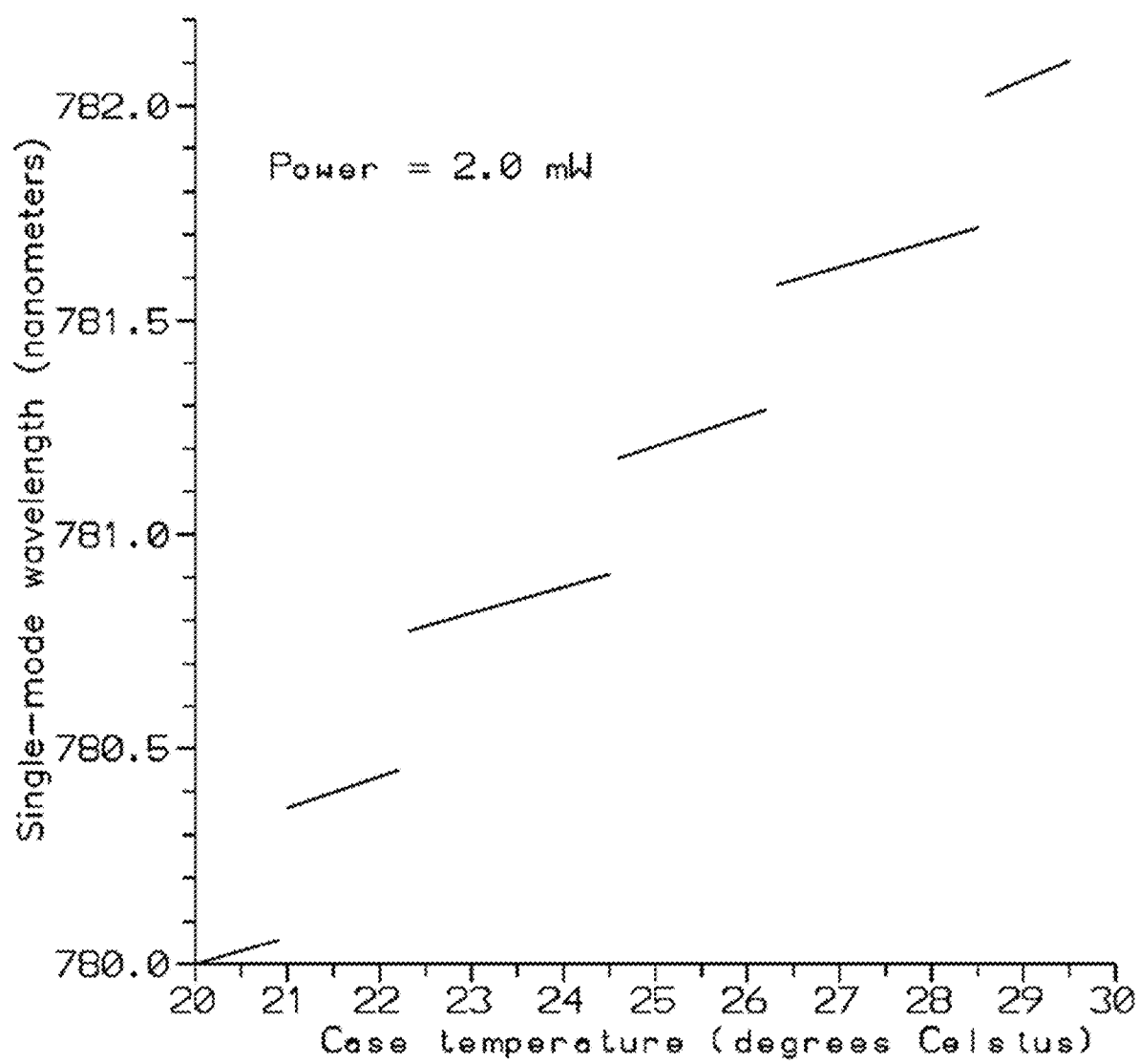
FIG. 3 is a graph showing frequency sweep of a Fabry Perot type laser diode due to temperature variations. The frequency change is composed of monotonically varying frequency sweeps interposed by discontinuous frequency jumps called mode hops.

The are many types of single longitudinal and spatial mode narrow spectral width lasers. The Distributed Feedback (DFB) laser is such a device by way of example, but it is rather expensive. A Fabry Perot laser can also exhibit single longitudinal and spatial mode narrow spectral width characteristics under certain conditions and is less expensive. FIG. 3 is a graph showing the frequency sweep of a Fabry Perot laser diode due to temperature variations. The frequency change is composed of monotonically varying frequency sweeps interposed by discontinuous frequency jumps called mode hops.

Single longitudinal lasers often suffer from longitudinal mode hops. In order to overcome this by embodiments of the present invention, a feedback signal for a mode hop free operating regime can be obtained by purposely roughening part of an area on the consumable, on the surface within the laser TIR spot, which is also within the field of view (FOV) of the camera. That roughened area would be monitored by the camera and illuminated by the laser. The interaction of the laser with the roughened surface will produce a stationary speckle signal for a stable frequency. In the event of a mode hop, the image would switch between two speckle patterns. The stability or the speckle pattern will be utilized as a feedback signal for the control loop. Another possibility is to supply the system with a slide which can be positioned in the opto-mechanical module in place of the consumable. This slide will have a roughened surface in the field of view of the camera in the region of the laser incidence. This calibration step will be performed before a viral diagnostic step is taken and will be controlled by the system with instructions given to the user, if necessary, by GUI, audibly or by other method.

The control system will achieve mode hop free operation through a calibration procedure. The control system will sweep the frequency of the laser. The laser will undergo regions of monotonic frequency sweep interrupted by mode hops as shown in FIG. 3. The speckle pattern produced due to the frequency shift will continuously vary in the monotonically varying frequency sweep regions, but a mode hop will produce a discontinuous change in the shape as well as in the intensity of the speckle pattern which will be easily identified by the algorithm. The algorithm will then instruct the control system to set the frequency between two mode hop regions.

A typical light source could be a laser diode (LD), by way of example. Frequency sweeping a LD can be achieved by varying its temperature or current by way of example. The calibration procedure will involve sweeping the laser frequency. The frequencies at which the laser will mode hop will be recorded with the associated laser operating conditions like current and temperature by way of example. The optimal laser operating condition will be half way between two mode hops by way of example but any frequency far enough from a mode hop which will provide a stable frequency operation would be appropriate. The control system will monitor the temperature of the environment during the intended use of the system for viral detection. The control system will set the laser frequency at a stable, mode hop free, operating position with a temperature above that of the environmental temperature. Setting the laser temperature above that of the environment is necessary when the control of the laser temperature is provided by resistive heating since resistor can only provide heating but no cooling. The system will be ready for a viral diagnostic measurement once the laser frequency has stabilized.

An alternative to stabilizing the laser temperature by way of resistive heating is by stabilizing the temperature with a device that can provide heating as well as cooling like a TEC by way of example. A mode hop free operating condition can then be provided without regard to the temperature of the environment. Clearly, operating the laser close to the environmental temperature would save energy.

The point of care device for the home user could take advantage of the camera of a smart phone. This is usually a CMOS RGB camera with a very effective low pass optical filter that blocks the NIR electro-magnetic radiation. A visible laser would probably have to be used. The table top instrument could use a monochrome camera for which a wider choice of lasers is available including IR LDs.

Possible Implementations by Way of Example

Figure 4:
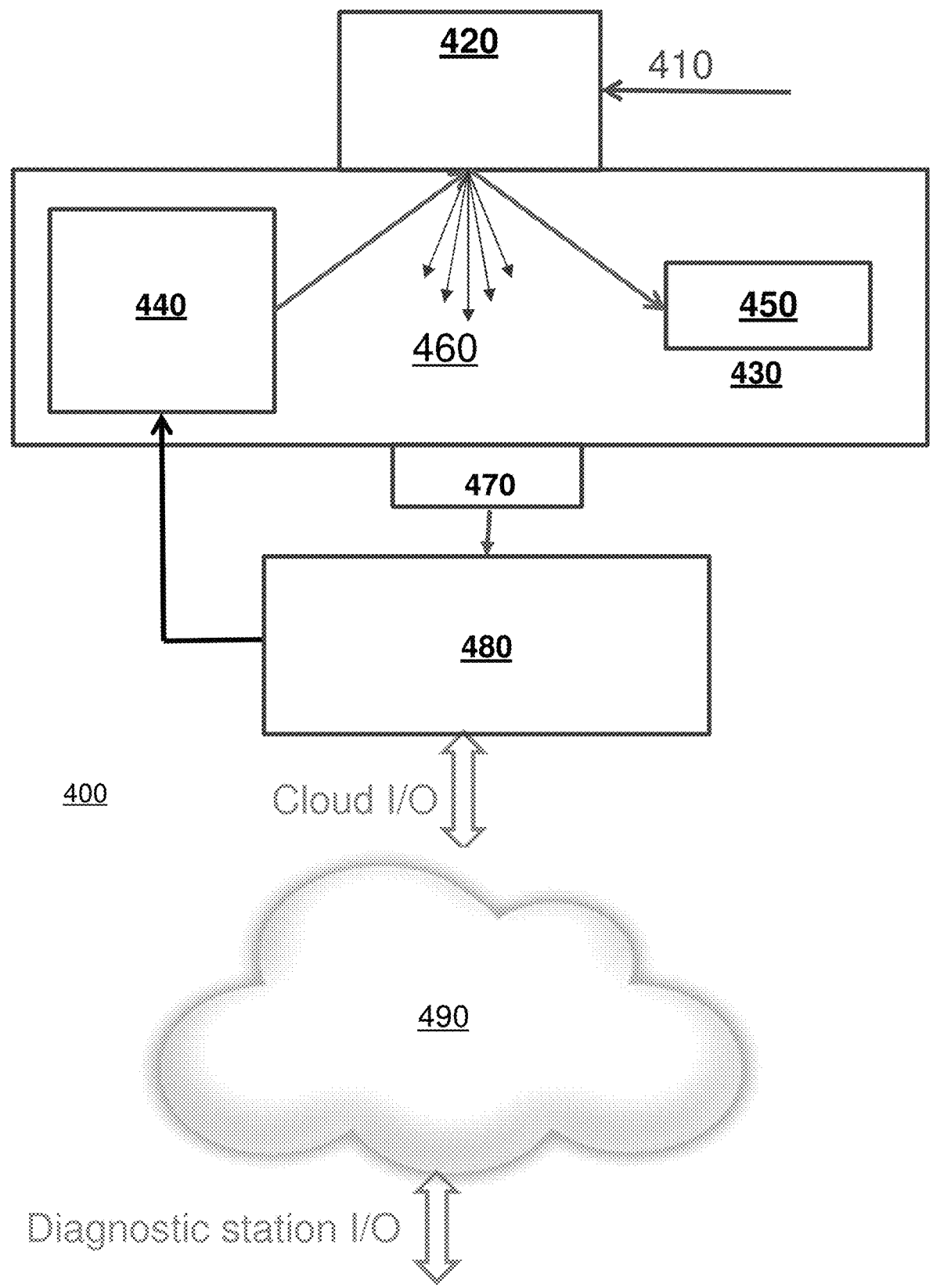
FIG. 4 is a block diagram illustrating implementation of optics based viral diagnostics system. The optical speckle signature is uploaded to the cloud and stored in a database. Machine learning based algorithms analyzes the optical signature and returns an answer if the test is positive, negative or that the procedure has to be repeated if the result is inconclusive. It is noted that the communication may be in two ways: Speckle uploaded from the base station to the cloud and answer downloaded from the cloud to the base station.

There are several possibilities for implementing the methodology and FIG. 4 depicts a block diagram of one by way of example. A saliva intake is inserted into consumable part 420 which is optically coupled in operation, to electro-optical part 430. The processor 480 controls the operation and timing of the laser 440 and the camera 470 which captures the scattered lighting 460 as well as guides the user through the diagnostic procedure with the help of appropriate GUI software through audio, video, pictorial or other mode of interface. The optical speckle signature is uploaded to the cloud 490 and stored in a database. An algorithm, machine learning based by way of example, analyzes the optical signature, possibly in a cloud 490 and returns an answer if the test is positive, negative or that the procedure has to be repeated if the result is inconclusive.

According to some embodiments of the present invention, the system may include several subsystems and some implementations are described herein by way of example:

Consumable Part Having Two Main Functions

According to this embodiment, the consumable part serves as a trap for adsorption of the virus from the saliva sample and is a robust platform for optical testing. The consumable will be made of a base that is at least transparent in the optical path region with a size similar to the bearing glass of a biological microscope by way of example. A viral trap will be implemented on one of the surfaces of the consumable. One possibility is to use surface chemistry methods to attach specific antibodies that will bind to the tested virus as is known in the art. The consumable, interfaces on the one hand with the opto-mechanical module and on the other hand with the camera that acquires a scattering based optical signature resulting from the specific trapped virus.

A flow system, which is part of the consumable, that allows the saliva sample to flow over the surface. While the tested virus binds to the trap in a stationary state, the other saliva components are in motion and are washed out. The flow channel can be fed by a reservoir into which the saliva is inserted. The saliva can be made to flow spontaneously due to a channel with a capillary structure or partly capillary structure by way of example. The saliva can also be made to flow under an external driving force like a syringe, a vacuum vessel that is punctured by the user or a pressure vessel that is punctured by the user, all these by way of example.

An opto-mechanical module contains a light source like a coherent laser diode by way of example. The consumable part interfaces mechanically in a precise manner with the opto-mechanical module to ensure that the light beam illuminates the viral trap on the consumable. A camera in the opto-mechanical module acquires the optical signature obtained from the scattering pattern of the laser beam from the consumable's surface to which the virus binds.

Smartphone-Based Device for the Home User

According to this embodiment, a smartphone is used for acquiring the optical signature, uploading it to the cloud and receiving the test results is managed on the smartphone to reduce costs. The user could purchase consumables at a pharmacy for example and with the help of a simple and inexpensive opto-mechanical module will interface it with a smartphone. The inexpensive opto-mechanical module will be purchased once for reuse while the consumable part will be purchased whenever a viral diagnostic test would be required. The smartphone's camera will acquire the optical signature and upload the data to the cloud where the data will be analyzed. The result will give the subject an indication of his condition so that he will decide, in case of a positive result, on the required approach. This type of use is similar to a thermometer model in which, according to the temperature obtained, the home user decides on additional steps. It is possible that later, with appropriate regulation, the test results will be uploaded to a central site and, if necessary, will be interfaced with Electrical Medical Record (EMR) to manage the spread of the virus on a national scale for example.

Most new smartphones have more than a single camera. With a multiple camera smartphone, one camera could be dedicated to acquiring the optical signature from the consumable while another camera could be used for facial recognition by way of example. This could verify the identity of the tested user and would provide him with an authenticated certificate administered by a licensed authority.

Single Board Computer Based Desktop Device

This embodiment may be located in clinics of family doctor, pharmacies, entry and exit airport terminals by way of example. The test will be administered, in this case by the doctor, pharmacist or company that has been authorized to perform tests, all of whom, would be licensed to provide the patient with a certificate stating whether the result of the tests where positive or negative for the virus. The tests could be performed in a similar way to that of the smart phone-based device, possibly using the same consumable, a similar GUI and performing the analysis in the cloud.

GUI software-launches a management application to perform a test. Instructs the user on how to perform the test and alerts, if necessary, whether the test has to be repeated.

Software located in the cloud/server and receives the optical signature and stores it. An algorithm, machine learning based by way of example, implemented in the software analyzes the optical signature and the system returns an answer to the home user, the clinic, the testing company or any other body, whether the test has come up with a Positive, Negative or Inconclusive Result. The cloud will have to be developed according to the regulatory requirements that include amongst others the principles of HIPA, and the GDPR and according to cyber considerations, in order to maintain privacy.

Possible Implementations with a Smart Phone

Figure 5:
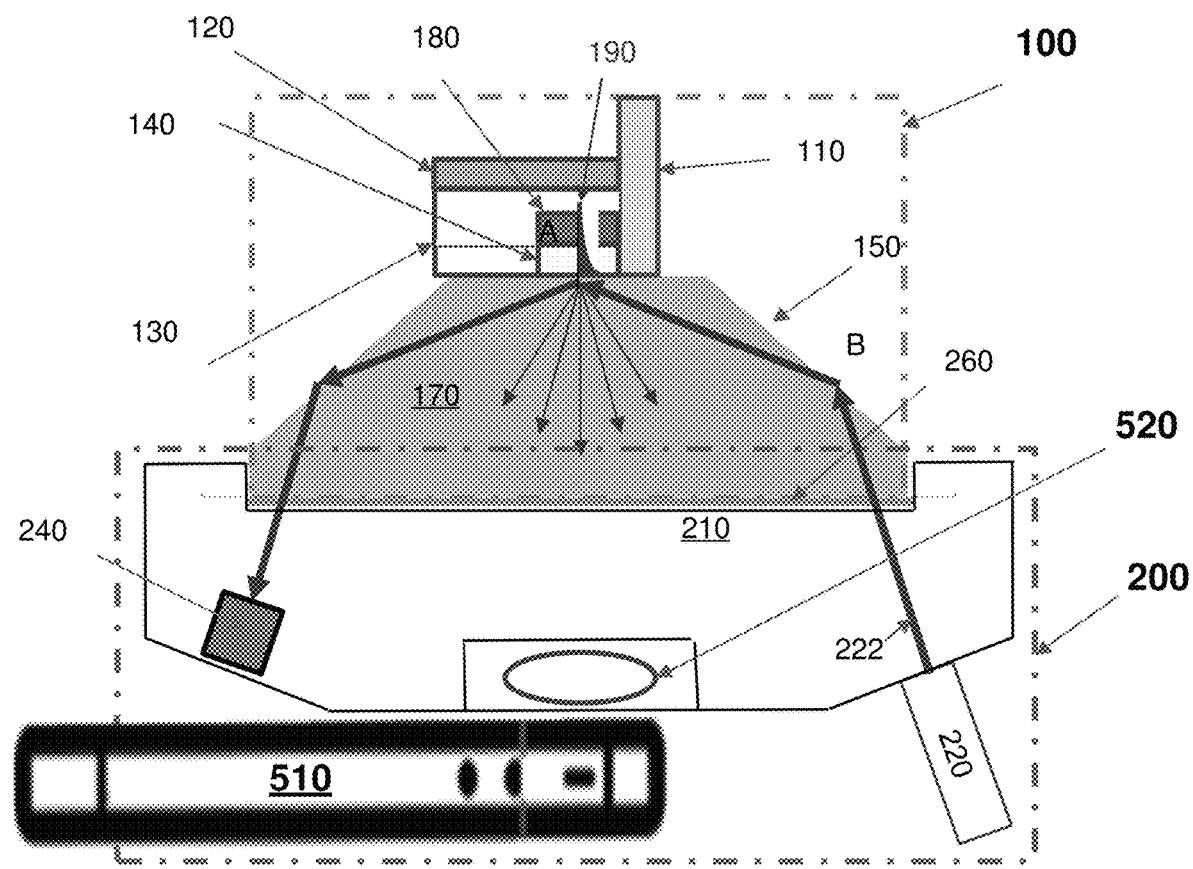
FIG. 5 is a diagram illustrating an embodiment in which a camera of a smartphone will be used to manage the testing procedure, obtain the speckle signature, upload the speckle signature to the cloud and download the feedback to the user, in the version targeted towards the home user. The connector of the smart phone, Wi-Fi, Bluetooth or other busses will interface to the laser and other subsystems to time and control the different processes necessary for the diagnostic steps.

A possible implementation for the home user, taking advantage of the capabilities of a smart phone, is depicted in FIG. 5. The electro optical part will contain an adjustable smart phone holder which could be adjusted to hold any size smart phone by way of methods known in the art.

This smart phone holder will interface with the opto-mechanical module through an additional mechanical adjustment mechanism, by way of methods known in the art, to align the field of view of the smart phone camera with the viral trap or traps. The adjustment of the smart phone camera field of view to the trap will be performed only once for a given smart phone model and will be achieved through a calibration protocol that the user will perform by guiding him through a GUI or audio commands from the smart phone or in any other communication manner.

The opto-mechanical module will contain additional optics to allow macro photography of the speckle pattern at a range which will provide the optical magnification appropriate for the optimal scattering signal collection to enhance the viral detection and identification capabilities.

It is noted that the consumable part is depicted in the figures in a generally horizontal orientation but any orientation as well as placement and orientations of the different subsystems and components relative to each other would be possible by applying design methodologies as are known in the art.

Adjustment Mechanisms to Position the Smart Phone Camera in Relation to the Viral Trap According to some embodiments, at least two adjustment mechanisms are integrated into the opto-mechanical module: One adjustment mechanism will include flexible retaining clips 650 in sufficient number to surround the smart phone and hold it in place. The element designated in FIG. 6 by "A-Mechanism to adjust phone holder flexible retaining clips" will be used to adjust the distance between the flexible retaining clips to allow the attachment of any sized smart phone to the Phone Holder Base 620 in FIG. 6. The adjustment mechanism can be implemented by way of methods known in the art. This size adjustment will be performed by the user only once for his phone. The retaining clips 650 are "flexible" to allow the removal and installation of the smart phone, following the one time adjustment phase, in a precise enough position without having to readjust the distance between the clips.

Figure 6:
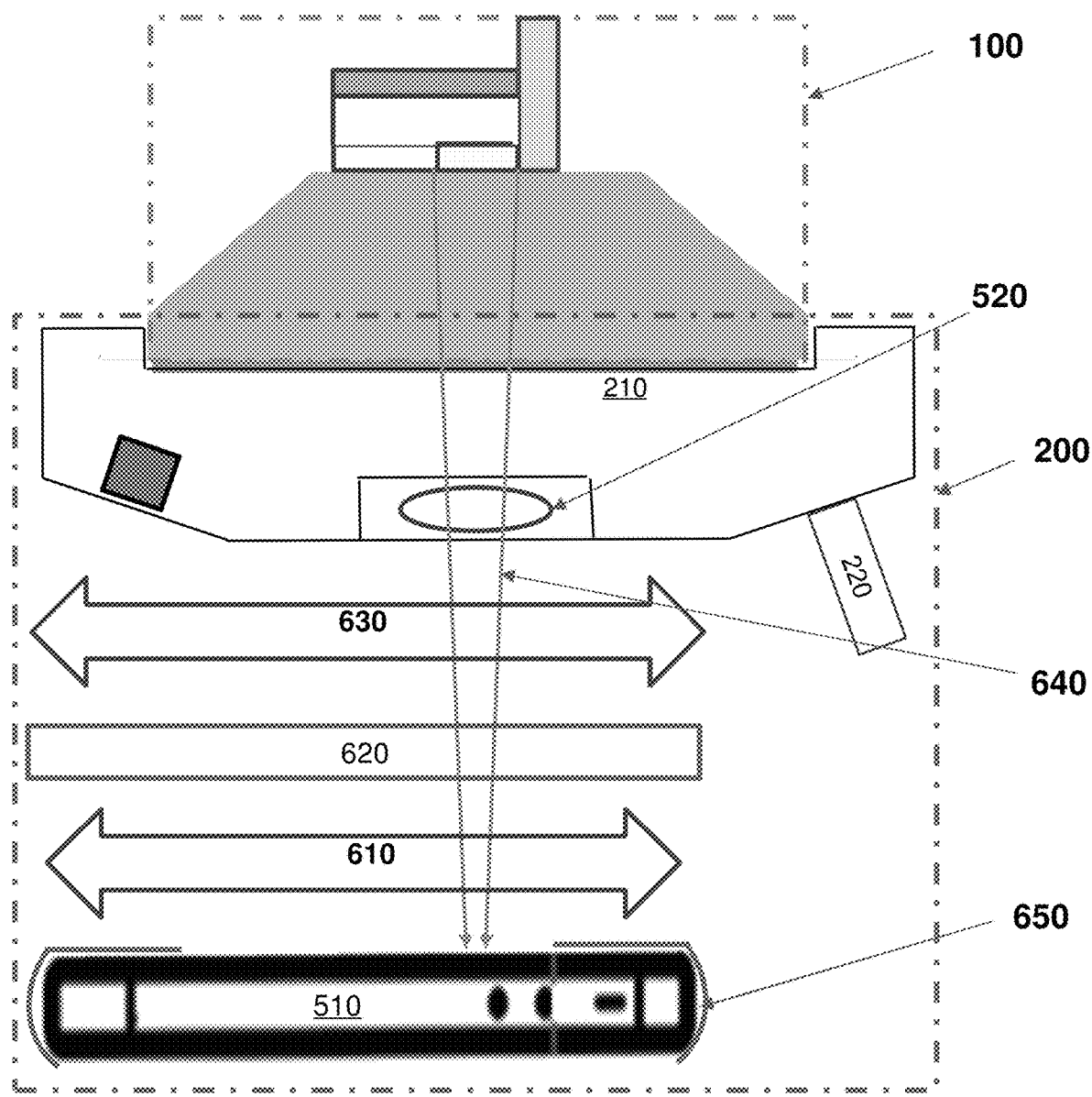
FIG. 6 is a diagram illustrating an embodiment in which two adjustment mechanisms are integrated into the opto-mechanical module to fix the smart phone in place: A-Mechanism to adjust phone holder flexible retaining clips. B-Mechanism to adjust camera phone Field of View towards trap. These mechanisms are used to correctly position the smart phone's camera in relation to the viral trap. The smart phone is not part of the opto-mechanical module but rather inserted into it whenever a diagnostic test is required. The A and B calibration procedures are performed only once for a given smart phone.

The element designated in FIG. 6 by "B-Mechanism to adjust camera phone Field of View towards trap", will be used, as the name implies, to position the smart phone's camera field of view so as to enable the collection of the scattered light from the viral trap. The adjustment mechanism can be implemented by way of methods known in the art. This position adjustment will be performed by the user only once for his phone.

The Base and/or the Transparent Block could include fiducials in the field of view of the camera in a known relative position to the trap. An algorithm will identify the fiducials acquired by the camera and instruct the user through a GUI, audibly or in any other communication manner, to manipulate the adjustment mechanism till the camera's field of view is in the correct position relative to the trap.

These fiducial, or any other pattern easily identifiable in the field of view of the camera, could be used for focusing purposes. A smart phone camera utilizes an automatic focusing method. The software that launches the management application to perform a test will position the focusing mechanism in a nominal position appropriate for the distances of the trap from the phone's camera, taking the macro optics 520 depicted in FIGS. 5 and 6 into account. The automatic focusing algorithm will perform a precise focusing procedure to bring the trap into best focus utilizing the fiducials as a reference.

Only a single section through the system is shown in FIG. 6 with one degree of freedom for the adjustment. An additional mechanism will perform the adjustment in a direction perpendicular to the paper plane. Other adjustment degrees of freedom can be implemented if required by methods known in the art.

Examples of the Device Structure

Figure 7A:
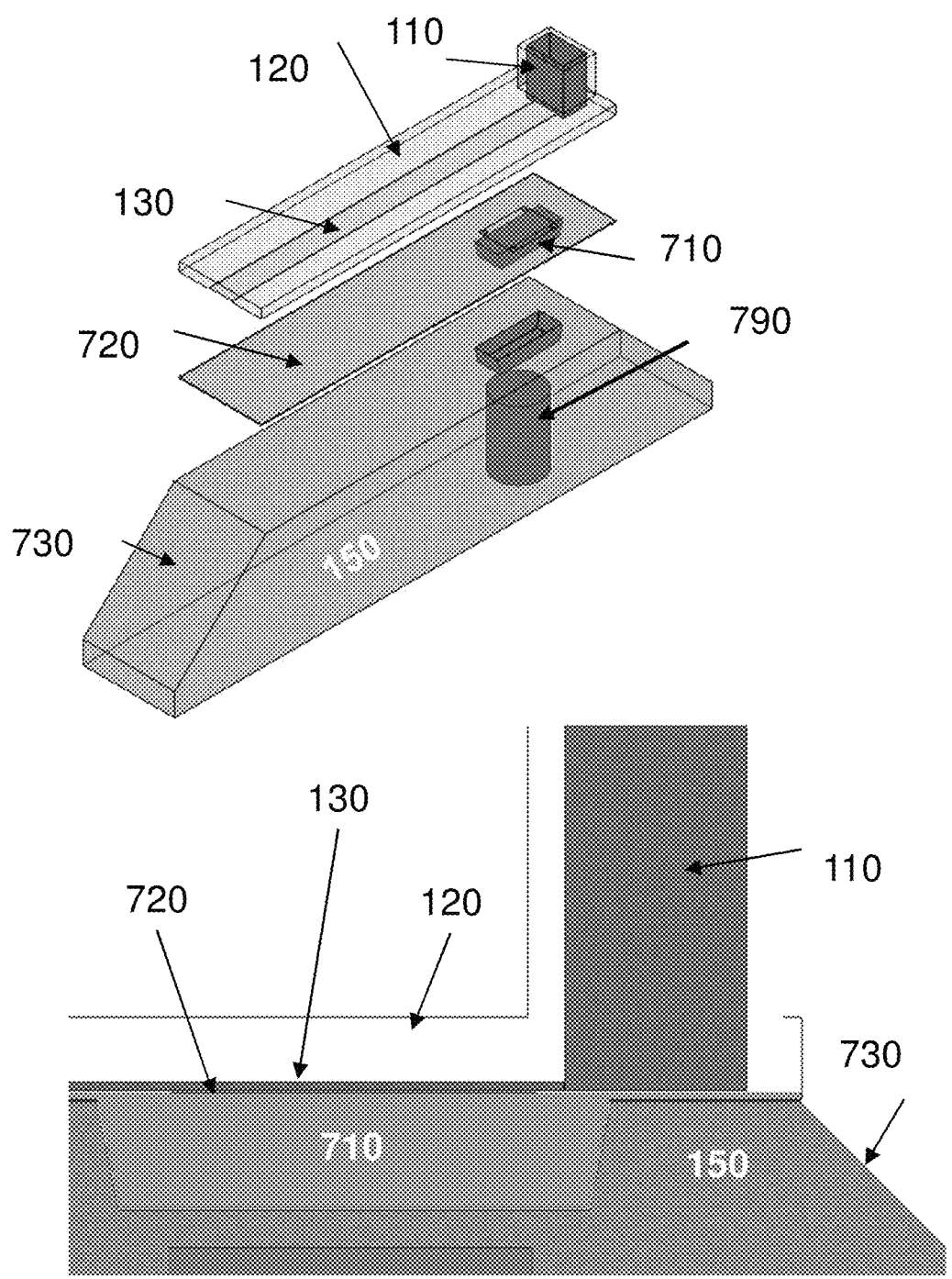
FIGS. 7A and 7B are diagrams illustrating an example of a possible consumable part structure in accordance with some embodiments of the present invention.
Figure 7B:
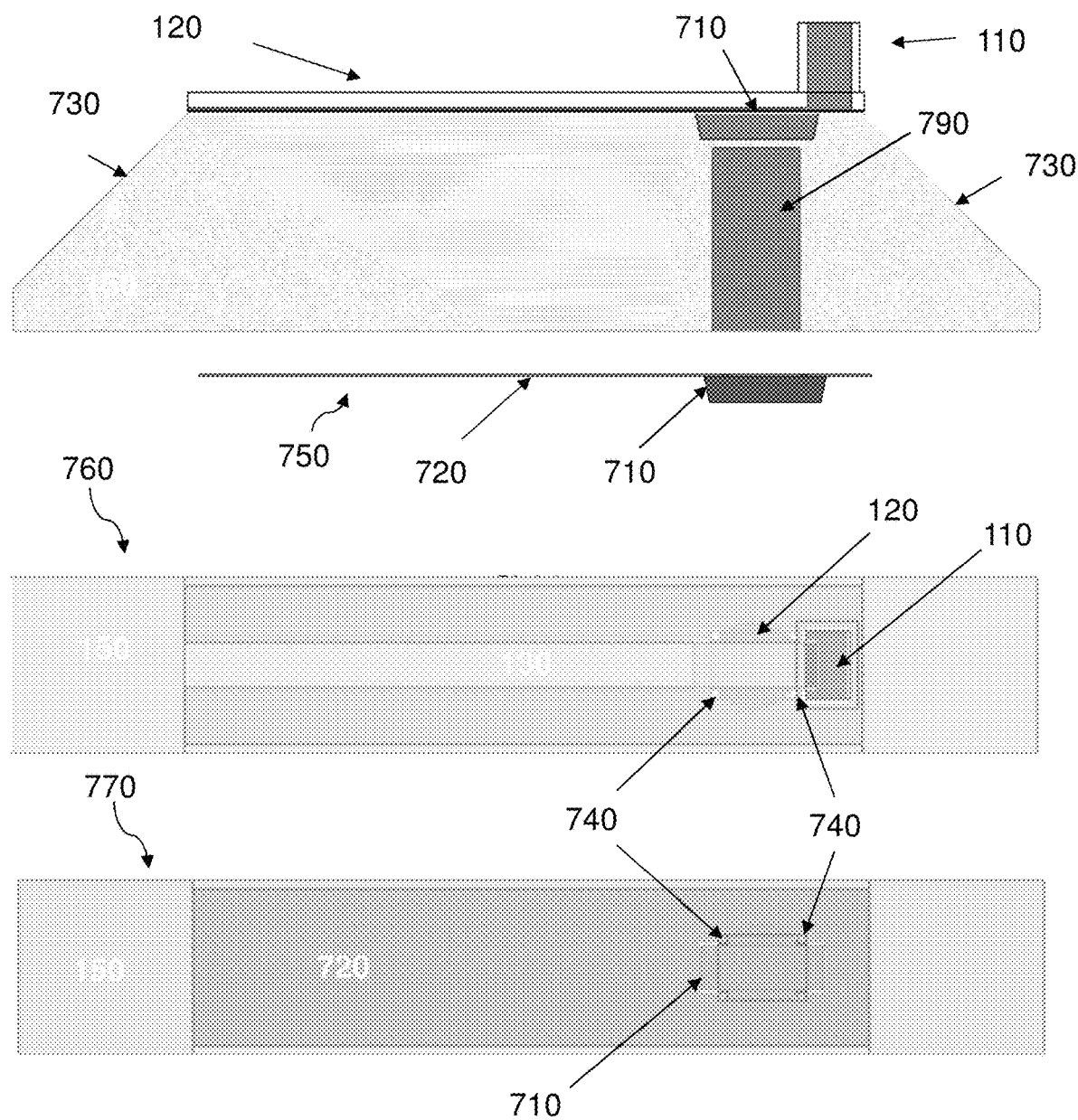

An example of a Consumable structure is shown in FIGS. 7A and 7B. The Consumable is generally composed of 3 main elements but many other structures can be implemented by anybody versed in the art. The views in FIG. 7 are partly transparent to allow a see through effect of the inner components. The exploded isometric on the top of FIG. 7A clearly depicts one possible implementation: (1) The Base, (2) The Low Index Layer, (3) The Flow Channel Cover. The base and low index layer are generally transparent, at least in the optical path. The base is made from a rigid material. It is generally true that relatively low refractive index materials, such as polymers by way of example, are relatively soft. FIG. 7 provides a possible implementation of the Low Index Layer made from a soft and low refractive index material supported for structural purposes by the base made from a rigid material 730. The use of different types of refractive indices in the region where the light beam is incident at TIR on the interface with the saliva provides control over the penetration depth of the evanescent wave into the saliva.

The lower image in FIG. 7A depicts an enlarged section of the consumable in the region of the saliva reservoir, Viral Trap and the region of the Laser's incidence at TIR. To the left of the saliva reservoir, an indentation in the base is filled by a lower refractive index material. This is the region at which the laser beam undergoes TIR at the interface between the Low Index material and the saliva made to flow from the saliva reservoir through the Flow Channel. The Low Index Layer, of the same material as that in the indentation in the base, interfaces to the flow channel for continuity. The flow channel therefore experiences a mechanically homogeneous surface on which the saliva can flow without encountering a discontinuity.

The top view in FIG. 7B is a side view of the consumable. The light scattered by the viruses can reach the camera through an opening in the base 150 in a possible implementation.

The view below the top section of the consumable is a section through the Low Index Layer. The current implementation depicts a thin Low Index Layer over most of the area apart from the region where TIR takes place. The Low Index Layer in the region where TIR takes place has to be of a size so as to accommodate the extent of the light beam.

The view above the bottom view in FIG. 7B is a top-down view of the consumable. The flow channel starts at the saliva reservoir and allows the flow of the saliva over the Viral Trap. The field of view of the camera is indicated by a black outline rectangle. The viral trap is not indicated specifically in the figure but generally resides in the Flow Channel on the Low Index Layer within the field of view of the camera and the TIR spot produced by the laser on the surface. Small square fiducials can be positioned at the edge of the rectangular field of view of the camera on the Low Index Layer. These fiducials can be used to focus the camera onto the viral trap by way of example. In the implementation that uses a smart phone, the fiducials can also be used for a one-time calibration of the field of view of the smart phone camera towards the viral trap by way of example.

The bottom view in FIG. 7B is a top down view of the consumable with the Flow Channel Cover removed. The view depicts the Low Index Layer. The field of view of the camera is indicated by a black outline rectangle. The viral trap is not indicated specifically in the figure but generally resides in the Flow Channel on the Low Index Layer within the field of view of the camera and the TIR spot produced by the laser on the surface. Small square fiducials can be positioned at the edge of the rectangular field of view of the camera on the Low Index Layer. These fiducials can be used to focus the camera onto the viral trap by way of example. In the implementation that uses a smart phone, the fiducials can be used for a one time calibration of the field of view of the smart phone camera towards the viral trap by way of example.

Figure 8A:
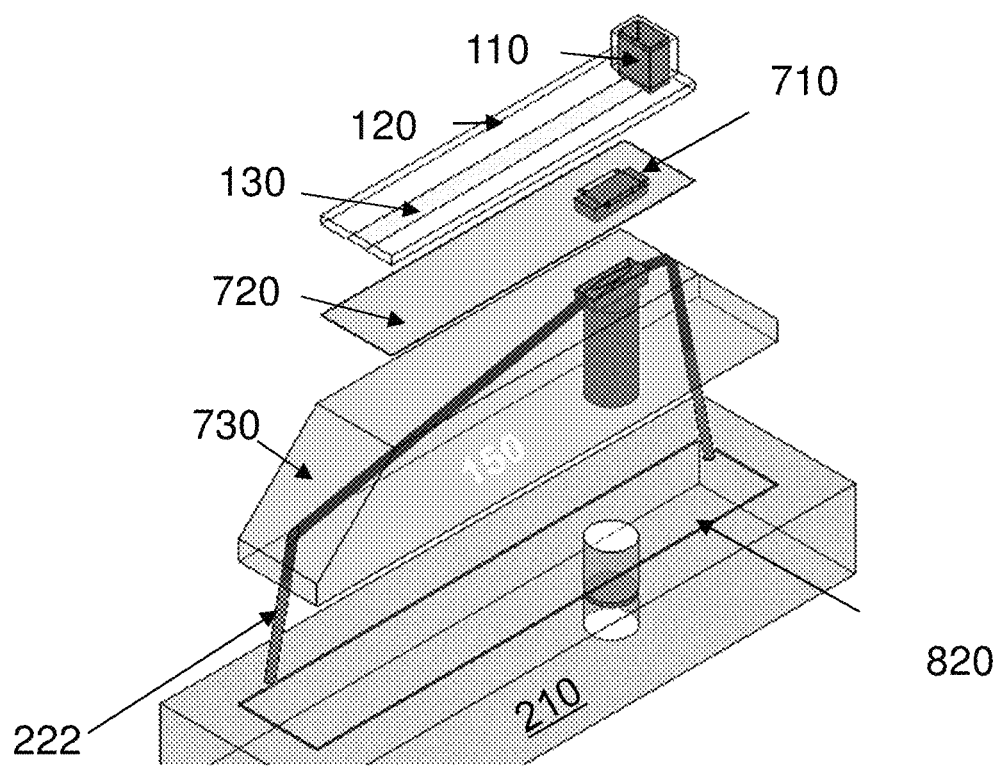
Figure 8A:
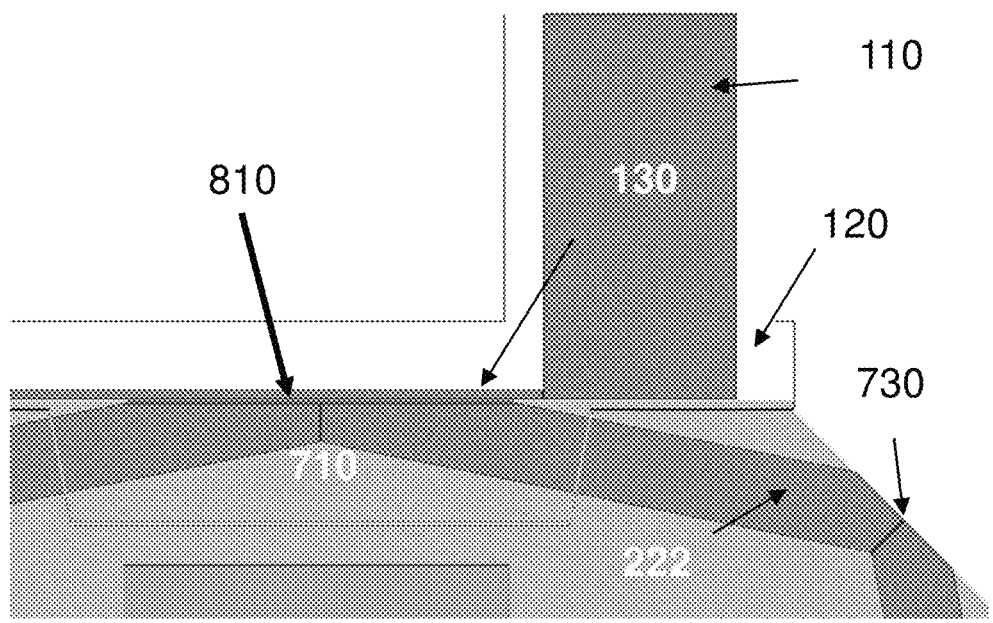

An example of the structure of the system with the Consumable inserted into the Opto-Mechanical Module and the light source turned on is shown in FIG. 8.

The consumable part is generally composed of 3 main elements but many other structures can be implemented by anybody versed in the art. The views in FIG. 8 are partly transparent to allow a see through effect of the inner components. The exploded isometric on the top of FIG. 8A clearly depicts one possible implementation: (1) The Base, (2) The Low Index Layer, (3) The Flow Channel Cover. The base and low index layer are generally transparent, at least in the optical path. The base is made from a rigid material. It is generally true that relatively low refractive index materials, such as polymers by way of example, are relatively soft. FIG. 8 provides a possible implementation of the Low Index Layer made from a soft and low refractive index material supported for structural purposes by the base made from a rigid material 150. The use of different types of refractive indices in the region where the light beam is incident at TIR on the interface with the saliva provides control over the penetration depth of the evanescent wave into the saliva.

The lower view on FIG. 8A depicts an enlarged section of the consumable in the region of the saliva reservoir, Viral Trap and Laser's incidence at TIR. In this figure the light path of the beam is shown in a possible implementation. To the left of the saliva reservoir, an indentation in the base is filled by a lower refractive index material. This is the region at which the laser beam undergoes TIR at the interface between the Low Index material and the saliva made to flow from the saliva reservoir through the Flow Channel. The Low Index Layer, of the same material as that in the indentation in the base, interfaces to the flow channel for continuity. The flow channel therefore experiences a mechanically homogeneous surface on which the saliva can flow without encountering a discontinuity. The turning mirrors manipulating the direction of the light beam can be implemented by TIR, dielectric or metal coatings. Many other light manipulating methods and devices exist as is well known in the art.

Figure 8B:
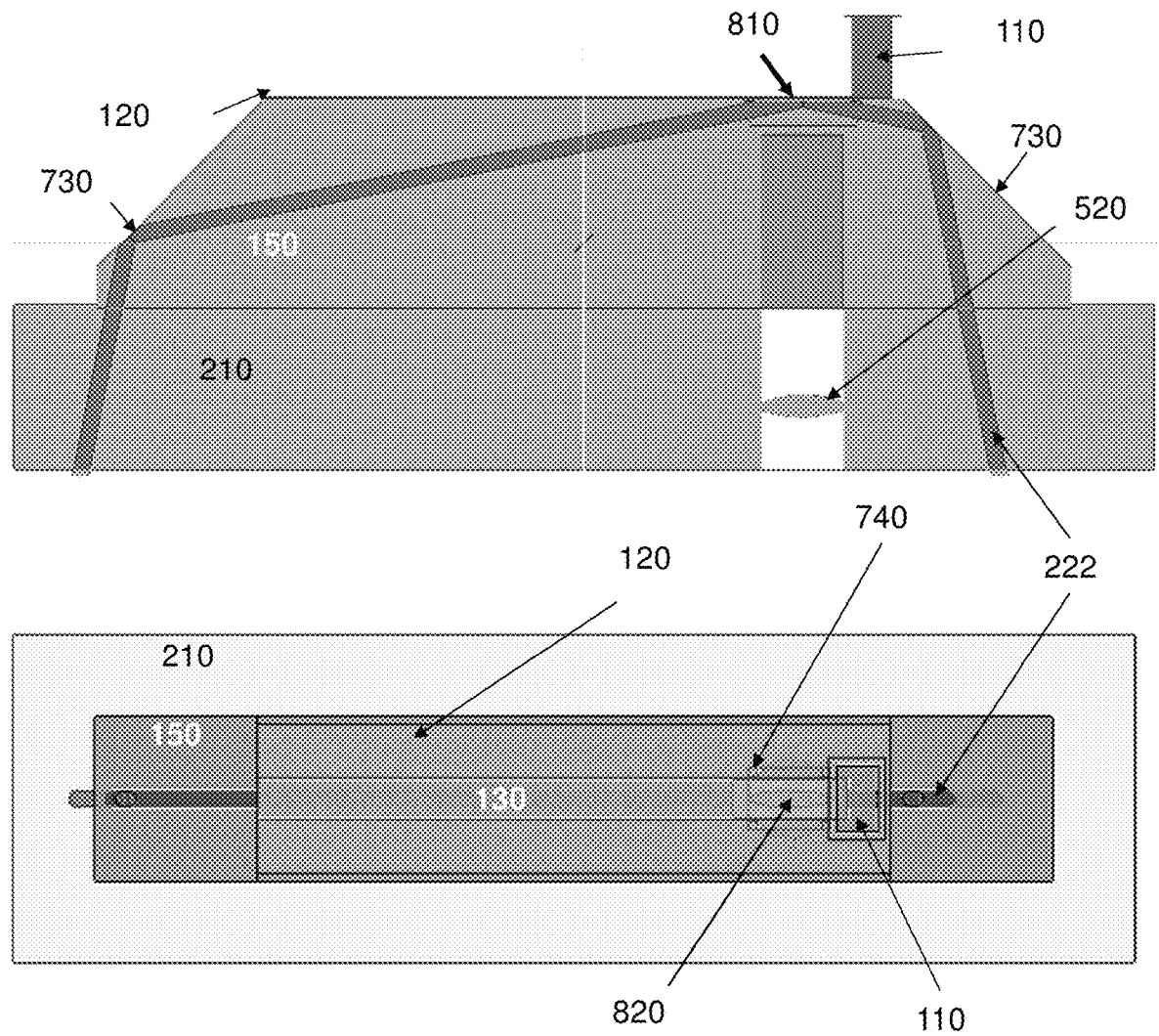

The top view in FIG. 8B is a side view of the consumable placed precisely on the Transparent Block which is part of the opto-mechanical module. The mounting precision of the consumable within the opto-mechanical module is guaranteed by a depression in the Transparent Block which is part of the opto-mechanical module as shown in the top isometric view of FIG. 8A. The Macro Optics is used to image the light scattered from the Viral Trap onto the camera sensor. The laser, camera and laser light trap which are part of the Opto-Mechanical Module, are not shown to improve the clarity of the figure since their integration can be easily achieved by methods known in the art.

The bottom view in FIG. 8B is a top-down view of the consumable placed on the Transparent Block which is part of the Opto-Mechanical Module. The flow channel starts at the saliva reservoir and allows the flow of the saliva over the Viral Trap. The field of view of the camera is indicated by a black outline rectangle. The viral trap is not indicated specifically in the figure but generally resides in the Flow Channel on the Low Index Layer within the field of view of the camera and the TIR spot produced by the laser on the surface. Small square fiducials may be positioned at the edge of the rectangular field of view of the camera on the Low Index Layer. These fiducials may be used to focus the camera onto the viral trap. In the implementation that uses a smart phone, the fiducials may be used for a one-time calibration of the field of view of the smart phone camera towards the viral trap.

A General Device and Method for Detecting and Identifying Pathogens

It is noted that the terminology of virus detection and/or identification is used herein. However, the delineated methods and devices could equally apply to the detection and identification of other types of pathogens that can be trapped by way of methods known in the art. The analysis of the light scattered from the trapped pathogens will then provide the indication required to detect and identify the pathogen by applying the appropriate algorithms.

Pathogen Carriers

The details in this submission were describe using saliva as the pathogen carrier. Other pathogen carriers like nose mucus nasal swab, produce, flora and fauna and commercial product, by way of example, could also take advantage of the methods and devices described here for pathogen detection and/or identification. The carriers could in some cases be used in their natural form or mixed in other materials to dilute their concentration, neutralize foreign components in the pathogen carrier or for any other reason to enhance the detection and identification capability of the device and method.

Product Identification Code

An identification code can be implemented on the opto-mechanical module as well as on the consumable. The identification code could be positioned within the field of view of the smart phone camera which would be able to decipher its content. This could be used for applications like product tracking, item identification, time tracking, document management, authentication, general marketing and for other purposes. QR is a well-known methods for achieving this purpose, but other coding methodologies exist like holograph by way of example.

The invention claimed is:

1. A system for optical detection of pathogens in a thin layer of fluid, the system comprising:
   a consumable part comprising:
      a fluid reservoir having at least one surface;
      a pathogen trap on at least one surface in fluid communication with the fluid reservoir via a flow channel; and
      a base attached to the fluid reservoir with the flow channel overlapping the surface; and
   an electro-optical part comprising:
      a transparent block optically couplable to a transparent base;
      a generally coherent light source for directing a generally a coherent light beam at the at least one surface at an angle selected to cause total internal reflection of the generally coherent light beam at the surface and an evanescent wave penetrating the fluid;
      a camera facing the surface for capturing light scattering being scattered off the pathogens on the pathogen trap due to an interaction with the evanescent wave, forming a speckle image, wherein the speckle image is produced by the coherent beam; and
      a computer processor configured to analyze the speckle image, to detect and identify pathogens in a fluid inserted into the fluid reservoir.

2. The system according to claim 1, wherein the consumable part further comprises a fluid channel and wherein through a flow channel, and wherein the pathogen trap on the at least one surface is in fluid communication with the fluid reservoir through the fluid channel which is designed to ensure continuous flow of the fluid over the pathogen trap.

3. The system according to claim 1, wherein the generally coherent light source comprises single longitudinal and spatial mode narrow spectral width laser.

4. The system according to claim 3, further comprising a control mechanism which guarantees a mode hop free mode for the single longitudinal and spatial mode narrow spectral width laser by monitoring and controlling operational temperature of the laser.

5. The system according to claim 3, further comprising a control mechanism which monotonically varies frequency range, away from mode hops, by monitoring speckle stability.

6. The system according to claim 1, further comprising an optical index matching layer between the transparent block and the base.

7. The system according to claim 1, further comprising a low optical index layer between the transparent base and the surface of the pathogen trap of a material having a higher refractive index than the fluid and a lower refractive index than the refractive index of the base.

8. The system according to claim 1, wherein the camera and the computer processor is part of a smartphone, wherein the electrooptical part is configured to couple the camera of the smartphone with the consumable part.

9. The system according to claim 1, wherein the computer processor is configured to analyze the speckle image using algorithms developed by deep learning methodologies.

10. A method of optical detection of pathogens in a thin layer of fluid, the system comprising:
providing a consumable part comprising:
  a fluid reservoir having at least one surface;
  a pathogen trap on at least one surface in fluid communication with the fluid reservoir via a flow channel; and
  a transparent base attached to the fluid reservoir with the flow channel overlapping the surface; and
providing an electro-optical part comprising:
  a transparent block optically couplable to the transparent base;
  a generally coherent light source for directing a generally a coherent light beam at the at least one surface at an angle selected to cause total internal reflection of the generally coherent light beam at the surface and an evanescent wave penetrating the fluid;
  a camera facing the surface for capturing light scattering being scattered off the pathogens on the pathogen trap due to an interaction with the evanescent wave, forming a speckle image, wherein the speckle image is produced by the coherent beam; and
  analyzing, using a computer processor, the speckle image, to detect and identify pathogens in a fluid inserted into the fluid reservoir.

11. The method according to claim 10, wherein the consumable part further comprises a fluid channel and wherein through a flow channel, and wherein the pathogen trap on the at least one surface is in fluid communication with the fluid reservoir through the fluid channel which is designed to ensure continuous flow of the fluid over the pathogen trap.

12. The method according to claim 10, wherein the generally coherent light source comprises single longitudinal and spatial mode narrow spectral width laser.

13. The method according to claim 12, further comprising a control mechanism which guarantees a mode hop free mode for the single longitudinal and spatial mode narrow spectral width laser by monitoring and controlling operational temperature of the laser.

14. The method according to claim 12, further comprising a control mechanism which monotonically varies frequency range, away from mode hops, by monitoring speckle stability.

15. The method according to claim 12, further comprising an optical index matching layer between the transparent block and the base.

16. The method according to claim 12, further comprising a low optical index layer between the transparent base and the surface of the pathogen trap of a material having a higher refractive index than the fluid and a lower refractive index than the refractive index of the base.

17. The method according to claim 12, wherein the camera and the computer processor is part of a smartphone, wherein the electrooptical part is configured to couple the camera of the smartphone with the consumable part.

18. The method according to claim 12, wherein the computer processor is configured to analyze the speckle image using algorithms developed by deep learning methodologies.

* * * * *